US012359474B2

(12) United States Patent
Graute et al.

(10) Patent No.: US 12,359,474 B2
(45) Date of Patent: Jul. 15, 2025

(54) MOTOR VEHICLE LOCK

(71) Applicant: Brose Schließsysteme GmbH & Co. Kommanditgesellschaft, Wuppertal, Wuppertal (DE)

(72) Inventors: Ludger Graute, Essen (DE); Markus Zillert, Düsseldorf (DE); Serkan Gülkan, Hattingen (DE); Andreas Hoffmann, Voerde (DE)

(73) Assignee: Brose Schließsysteme GmbH & Co. Kommanditgesellschaft, Wuppertal (DE)

(*) Notice: Subject to any disclaimer, the term of this patent is extended or adjusted under 35 U.S.C. 154(b) by 602 days.

(21) Appl. No.: 17/480,983

(22) Filed: Sep. 21, 2021

(65) Prior Publication Data

US 2022/0090418 A1 Mar. 24, 2022

(30) Foreign Application Priority Data

Sep. 22, 2020 (DE) ..................... 10 2020 124 695.1

(51) Int. Cl.
*E05B 81/06* (2014.01)
*E05B 81/14* (2014.01)
(Continued)

(52) U.S. Cl.
CPC .............. *E05B 81/06* (2013.01); *E05B 81/14* (2013.01); *E05B 81/20* (2013.01); *E05B 81/34* (2013.01); *E05B 81/46* (2013.01); *E05B 81/42* (2013.01)

(58) Field of Classification Search
CPC .......... E05B 81/06; E05B 81/14; E05B 81/20; E05B 81/34; E05B 81/42; E05B 81/46; E05B 81/90
See application file for complete search history.

(56) References Cited

U.S. PATENT DOCUMENTS

2005/0127685 A1* 6/2005 Spurr ...................... E05B 81/06 292/201
2017/0350170 A1* 12/2017 Cetnar .................... E05B 77/26

FOREIGN PATENT DOCUMENTS

DE 10021186 A1 9/2001
DE 10139975 A1 * 4/2002 ......... B22D 19/0009
(Continued)

OTHER PUBLICATIONS

Machine translation of WO2019210905A! (Year: 2019).*

*Primary Examiner* — Christine M Mills
*Assistant Examiner* — Christopher F Callahan
(74) *Attorney, Agent, or Firm* — Dickinson Wright PLLC

(57) ABSTRACT

A motor vehicle lock includes a lock latch, at least one pawl, an electric drive arrangement, and a drive controller. The drive controller controls the drive arrangement to carry out an opening movement that adjusts an adjusting arrangement of the lock from a starting position to a raising position of the adjusting arrangement, in which the adjusting arrangement raises the pawl. A clutch arrangement is arranged between an actuating lever and the pawl, wherein, in an intermediate position, the adjusting arrangement shifts, in the opening movement, the clutch arrangement out of the disengaging state into the engaging state, before the adjusting arrangement raises the pawl when the raising position is reached. In an unlocking routine, the controller controls the drive arrangement to start the opening movement, and, responsive to an intermediate position criterion representative being met, modifies the control such that the adjusting arrangement does not reach the raising position.

19 Claims, 5 Drawing Sheets

(51) Int. Cl.

| | |
|---|---|
| ***E05B 81/20*** | (2014.01) |
| ***E05B 81/34*** | (2014.01) |
| ***E05B 81/46*** | (2014.01) |
| *E05B 81/42* | (2014.01) |

(56) References Cited

FOREIGN PATENT DOCUMENTS

| | | | | | |
|---|---|---|---|---|---|
| DE | 19861282 | B4 | | 12/2011 | |
| DE | 202014104111 | U1 | * | 1/2016 | ............. E05B 81/06 |
| DE | 102013110201 | A1 | | 3/2016 | |
| DE | 102017126077 | A1 | | 6/2018 | |
| DE | 102018110700 | A1 | | 11/2019 | |
| WO | 2014044729 | A1 | | 3/2014 | |
| WO | WO-2015113545 | A1 | * | 8/2015 | ............. E05B 77/12 |
| WO | WO-2019210905 | A1 | * | 11/2019 | ............. E05B 81/14 |

* cited by examiner

MOTOR VEHICLE LOCK

CROSS-REFERENCE TO RELATED APPLICATIONS

This application claims priority to German Patent Application No. DE 10 2020 124 695.1, filed on Sep. 22, 2020, the disclosure of which is hereby incorporated in its entirety by reference herein.

TECHNICAL FIELD

The present disclosure relates to a motor vehicle lock.

BACKGROUND

Motor vehicles may include a number of motor vehicle locks configured to close or secure closures to a vehicle body. The motor vehicle lock contemplated here may be assigned to any locking element of a motor vehicle. In this regard, the term "locking element" should be interpreted broadly. It encompasses for example a side door, in particular a rear side door, a rear door, a tailgate, a boot lid, a front bonnet, an engine bonnet or the like. The locking element can be hinged to the body of the motor vehicle in the manner of a swing door or in the manner of a sliding door.

SUMMARY

The present disclosure attempts to address the problem of configuring and developing a motor vehicle lock such that the design is further simplified.

The motor vehicle lock may be configured such that, in an emergency, although unlocking of the motor vehicle lock is allowed via a clutch arrangement being shifted into the engaging state, simultaneous opening of the lock via motorized raising of the pawl may be ruled out on account of the associated safety risks.

As an example, in an unlocking routine, the drive controller controls the drive arrangement to start the opening movement, and the drive arrangement, upon fulfilling an intermediate position criterion representative for reaching the intermediate position, modifies the control such that the adjusting arrangement does not reach the raising position.

On the one hand, according to the proposal, opening of the lock is still possible via a complete opening movement of the drive arrangement. However, on the other hand, with the unlocking routine, there is the possibility of controlling the drive arrangement, which, although bringing about unlocking, at the same time avoids unintentional raising of the pawl. Via the definition of the intermediate position criterion, undesired opening of the lock latch, for instance during emergency operation, can be ruled out with a high degree of reliability. The motor vehicle lock according to the proposal may operate, in this case, with a single drive arrangement, which may be used both as a locking drive and as an opening support drive.

According to one or more embodiments, the opening movement ends, in the unlocking routine, with the intermediate position criterion being fulfilled and the drive arrangement is configured in a self-locking manner, such that the motor vehicle lock remains in the unlocked state in a simple and secure manner after the unlocking routine.

I the drive arrangement is controlled, in the unlocking routine, with a reduced drive power, improved security against any undesired passing of the intermediate position by the adjusting arrangement results with the resultant reduced driving speed.

The intermediate position criterion may be defined at least partially on the basis of an electric drive value, such that it is possible to dispense with additional sensors for the unlocking routine. A relatively high level of accuracy for the monitoring of the opening movement may result in this case via definition of the intermediate position criterion on the basis of the number of current ripples of the drive current that are passed through.

In other configurations, the motor vehicle lock may be provided with a position sensor, the sensor values of which are monitored for the fulfilling of the intermediate position criterion. The configuration of the position sensor with an electric switch may be provided, with the result that a cost-effective and at the same time reliable implementation of the position sensor is achieved.

The motor vehicle lock may include a locking arrangement that may be provided with a pivotable, such as a spring-preloaded locking lever, with the result that the shifting of the clutch arrangement is achieved with a relatively simple structure.

In one or more embodiments, the adjusting arrangement may include an adjusting lever, which is pivoted via the guide contour of a worm wheel, the worm wheel also actuates the locking lever via a driver. In this way, relatively reliable unlocking or locking and opening of the motor vehicle lock may be achieved. Via the configuration of the worm wheel, a safety distance between the intermediate position and raising position can additionally be implemented in a simple manner.

As an example a clutch lever of the clutch arrangement may be provided and the clutch lever may be in a disengaging position in the disengaging state of the clutch arrangement and in an engaging position in the engaging state of the clutch arrangement. The clutch lever then serves, in the engaging position, to transmit the actuating stroke to the pawl.

According to another embodiments, when the adjusting arrangement raises the pawl with a release lever, wherein the clutch arrangement can be arranged between the actuating lever and the release lever. The clutch lever can in this case, may be arranged on the release lever, with the result that a relatively simple and compact structure of the clutch arrangement can be implemented.

In the likewise preferred configuration, a further (second) actuating lever for raising the pawl is provided, which also acts on the pawl by the release lever in order to achieve a compact structure of the motor vehicle lock.

BRIEF DESCRIPTION OF THE DRAWINGS

In the following text, the invention is explained in more detail by way of a drawing which illustrates only one exemplary embodiment and in which.

DETAILED DESCRIPTION

Figure 1:
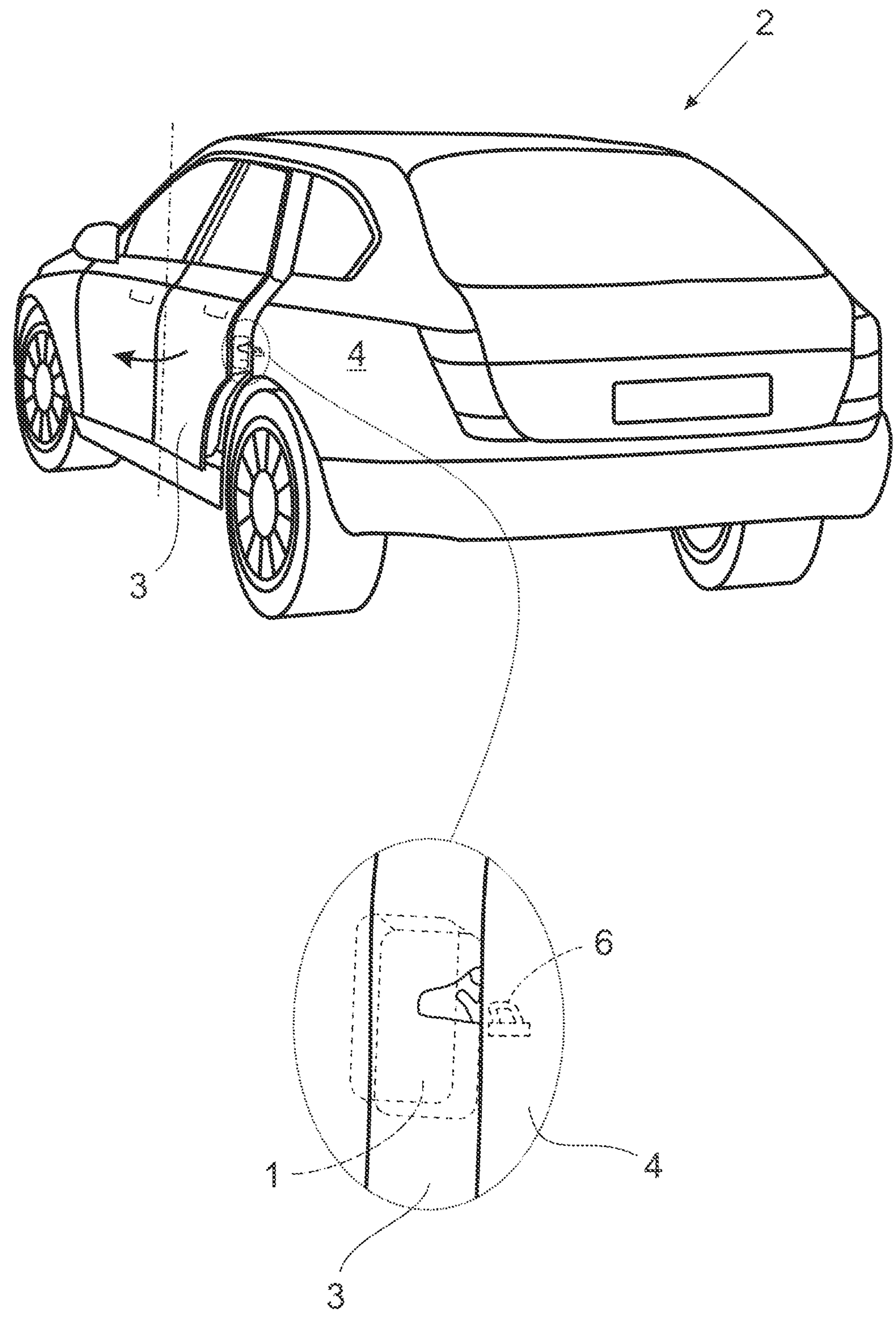
FIG. 1 shows a locking element of a motor vehicle in the form of a rear side door with a motor vehicle lock according to the proposal.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A known motor vehicle lock is described in DE 10 2013 110 201 A1 and includes with a lock latch that is pivotable about a geometric lock-latch axis and with at least one pawl that is pivotable about a geometric pawl axis, the lock latch is adjustable into an open position and into at least one locked position, and the pawl, in a lowered position, holds the lock latch in the locked position, and, in a raised position, releases the lock latch. The motor vehicle lock has an electric drive arrangement and a drive controller, wherein the drive controller controls the drive arrangement to carry out an opening movement such that the adjusting arrangement raises the pawl upon reaching a raising position.

Furthermore, the motor vehicle lock has an actuating lever that is pivotable about a geometric actuating-lever axis, and a clutch arrangement is arranged between the actuating lever and the pawl, said clutch arrangement being shiftable between an engaging state and a disengaging state. While, in the disengaging state, the actuating stroke of the actuating lever is idle with regard to the raising of the pawl, in the engaging state, the pawl is able to be raised via the actuating stroke of the actuating lever.

It is thereby possible to implement the motor vehicle lock as an “electric lock having mechanical redundancy”, which can be opened in principle, as part of an opening support function, in a motorized manner by the drive arrangement. Only in the emergency situation in which motorized raising of the pawl is not possible on account of a fault, is provision made of at least one additional drivetrain, such as to an external door handle, which, by means of the clutch arrangement, can be connected through to the pawl to be raised.

The known motor vehicle lock is advantageous in as much as a dual use of the drive arrangement as a locking drive, for the one part, and as an opening support drive is provided, and the adjusting arrangement also shifts the clutch arrangement from the disengaging state into the engaging state. However, this dual use represents a constructive challenge, since the drive arrangement has to be controlled to drive the clutch arrangement, for the one part, and to drive the locking element, for the other part, by way of a drive controller, without the two functions to be implemented impeding one another. The known motor vehicle lock in this case relies on a mechanical dual stroke function for the internal actuating lever, such that the lock can be opened even without a functional drive arrangement.

The motor vehicle lock 1 according to the proposal and illustrated in the drawing can be assigned to any locking element of a motor vehicle 2. As regards the further understanding of the term “locking element”, reference may be made to the introductory part of the description. In the exemplary embodiment that is illustrated and to this extent preferred, the locking element is a side door 3, in this case a rear side door, of the motor vehicle 2. All statements made in this regard apply accordingly to all other kinds of locking elements.

Figure 2:
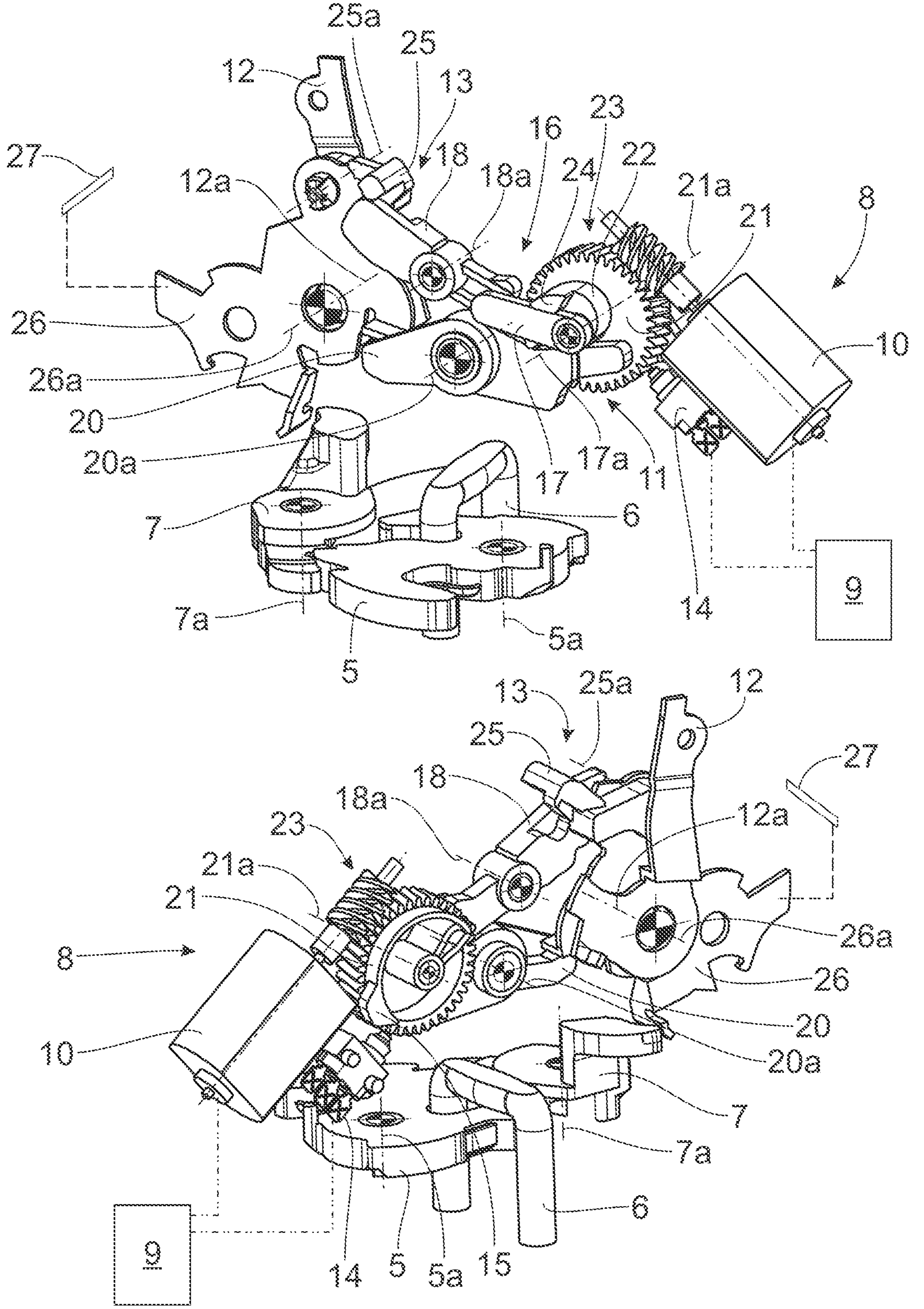
FIG. 2 shows adjustable components of the motor vehicle lock according to FIG. 1 in perspective illustrations.

In order to create a holding action between the side door 3 and the body 4 of the motor vehicle 2, the motor vehicle lock 1 is equipped with a lock latch 5, which is adjustable about a geometric lock-latch axis 5*a* into an open position, into at least one locked position, in particular into a main locked position illustrated in FIG. 2, and optionally into a pre-locked position between the open position and the main locked position. The lock latch 5 cooperates in a conventional manner with a locking part 6, as an example in the form of a striker, in order to hold the side door 3 in its respective locked position. In this case, the lock latch 5 is arranged on the side door 3 while the locking part 6 is arranged on the motor vehicle body 4. This can also be provided the other way around.

In order to realize the above holding action, the motor vehicle lock 1 has at least one pawl 7, in this case exactly one pawl 7. The solution according to the proposal can also be readily applied to a two-pawl system, however. For the purposes of a clear illustration, the following statements relate to an arrangement with only one single pawl 7.

The pawl 7, which in this case is pivotable about a geometric pawl axis 7*a*, is adjustable in a lowered position (FIG. 2, FIG. 3, FIG. 4), in which it holds the lock latch 5 in the at least one locked position, and in a raised position (FIG. 5), in which it releases the lock latch 5.

To raise the pawl 7, the motor vehicle lock 1 has an electric drive arrangement 8 and a drive controller 9. In the exemplary embodiment that is illustrated, the drive arrangement 8 is equipped with a drive motor 10. As an example, the drive arrangement 8 is equipped with a single drive motor 10, e.g., a rotary electric motor, allowing a simple and compact construction of the motor vehicle lock 1. The drive controller 9 administers the control-related tasks that arise during operation of the motor vehicle lock 1, in this case control of the drive motor 10.

Figure 5:
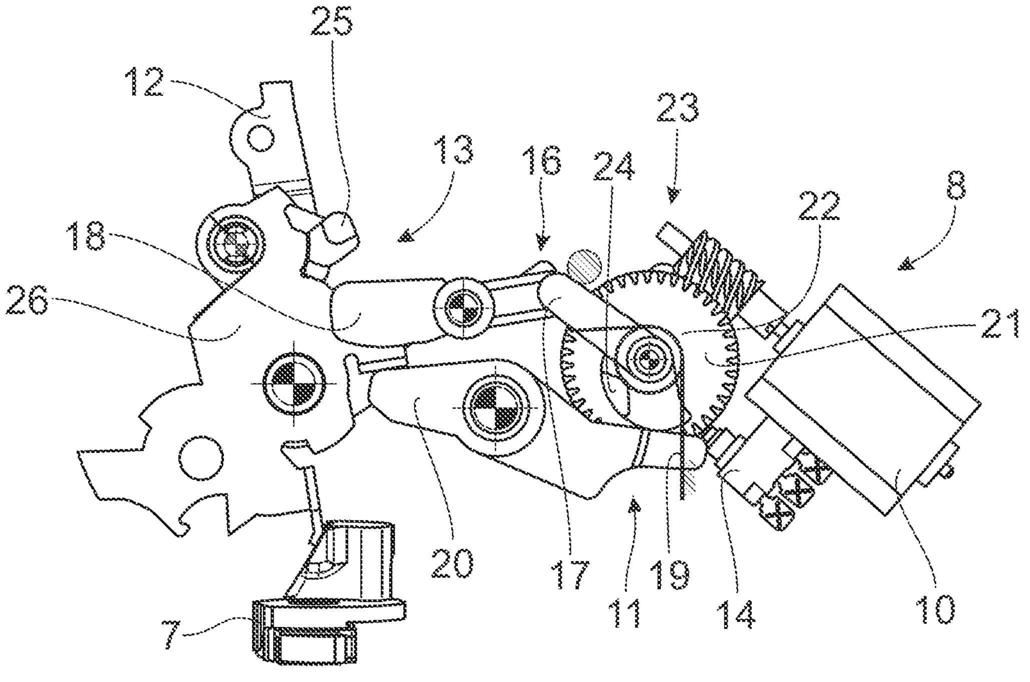
FIG. 5 shows the components from FIG. 4 in the raising position of the adjusting arrangement.

The drive controller 9 controls the drive arrangement 8 to carry out an opening movement in which the drive arrangement 8 adjusts an adjusting arrangement 11 of the motor vehicle lock 1 starting from a starting position (FIG. 3) to a raising position (FIG. 5) of the adjusting arrangement 11, in which the adjusting arrangement 11 raises the pawl 7. The adjusting arrangement 11 generally effects a mechanical conversion of the driving movement of the drive arrangement 8 into a movement of the pawl 7 in order to raise the pawl 7 when the raising position illustrated in FIG. 5 is reached.

To raise the pawl 7, the motor vehicle lock 1 also has an actuating lever 12 that is pivotable about a geometric actuating-lever axis 12*a* and is adjustable, in an actuating stroke, from a starting position into an actuating position. An actuating stroke comprises at least one outgoing movement from the starting position into the respective actuating position of the actuating lever 12.

This actuating lever 12 may be an external actuating lever, that is to say a lever which, in the mounted state, is coupled to an external door handle of the side door 3. This actuating lever 12 is not necessarily the only one of the motor vehicle lock 1, as will be explained in more detail below.

Moreover, a clutch arrangement 13 that is shiftable between an engaging state (FIG. 4) and a disengaging state (FIG. 2, FIG. 3) is arranged between the actuating lever 12 and the pawl 7. In the disengaging state, the actuating stroke of the actuating lever 12 is an idle stroke as regards the raising of the pawl 7. The pawl 7 is thus not raised by the actuating stroke in the disengaging state, as is indicated in the rear view A in FIG. 3. In the engaging state, by contrast, the pawl 7 is able to be raised by the actuating stroke of the actuating lever 12, wherein the actuating stroke is converted into a movement of the pawl 7 for raising the pawl 7, as is furthermore indicated in the rear view A in FIG. 4. As a result of the shifting from the engaging state into the disengaging state, the motor vehicle lock 1 is consequently locked. Conversely, as a result of the shifting from the disengaging state into the engaging state, the motor vehicle lock 1 is unlocked.

The actuating lever 12 may be set up for manual actuation. In this case, the term "manual actuation" stands for actuation that conducts a user movement via a mechanical connection to the component in question and triggers a mechanical adjusting movement there. As an example, in the mounted state, a user movement of the external door handle can be transmitted, with the clutch arrangement 13 in the engaging state, mechanically to the pawl 7 in order to raise the pawl 7, in order to implement mechanical redundancy. For emergency operation, in particular when the power supply of the motor vehicle 2 fails, a mechanical force action chain to the pawl 7 is thus additionally provided.

In an intermediate position (FIG. 4) provided between the starting position (FIG. 3) and the raising position (FIG. 5), the adjusting arrangement 11 shifts, in the opening movement, the clutch arrangement 13 from the disengaging state into the engaging state. Starting from the starting position with the clutch arrangement 13 in the disengaging state (FIG. 3), the opening movement in this case initially, when the intermediate position is reached, causes the clutch arrangement 13 to be shifted into the engaging state (FIG. 4) before the actuating arrangement 11 raises the pawl 7 when the raising position is reached. Only then is the pawl 7 raised by the adjusting arrangement 11 in the course of the further opening movement, when the raising position is reached, (FIG. 5).

The "shifting" of the clutch arrangement 13 from the disengaging state into the engaging state by the adjusting arrangement 11 should be understood broadly in the present case, wherein the clutch arrangement 13 can also only be released by the adjusting arrangement 11 to be transferred into the engaging state and, for example, the clutch arrangement 13 can be brought into the engaging state under spring loading. The adjusting arrangement 11 therefore does not necessarily have to force the clutch arrangement 13 into the engaging state, but rather merely ensure that the clutch arrangement 13 can adopt the engaging state in a manner unimpeded by the adjusting arrangement 11.

The drive controller 9, in an unlocking routine, controls the drive arrangement 8 to start the opening movement, and the drive controller 9, upon fulfilling an intermediate position criterion representative for reaching the intermediate position, modifies the control such that the adjusting arrangement 11 does not reach the raising position.

Figure 3:
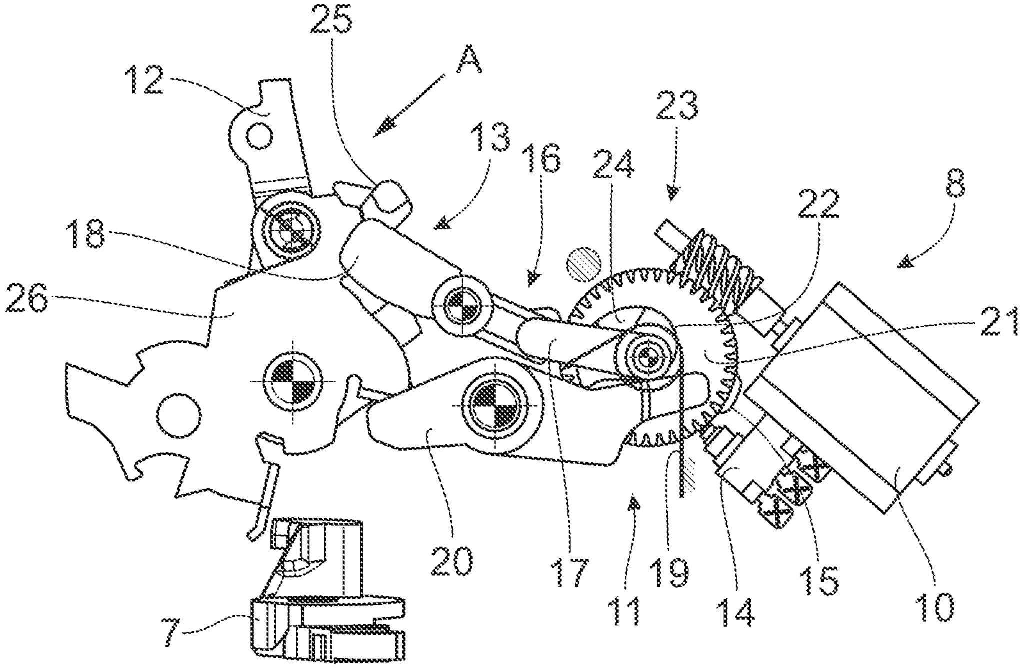
FIG. 3 shows some of the adjustable components of the motor vehicle lock according to FIG. 1 in the starting position of the adjusting arrangement.
Figure 3:
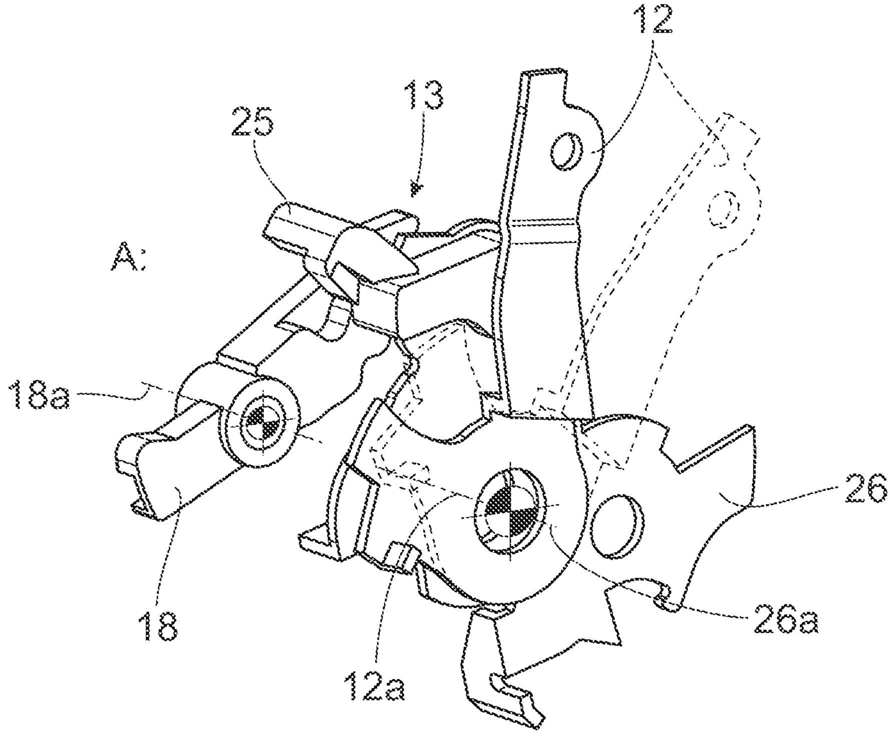
Figure 4:
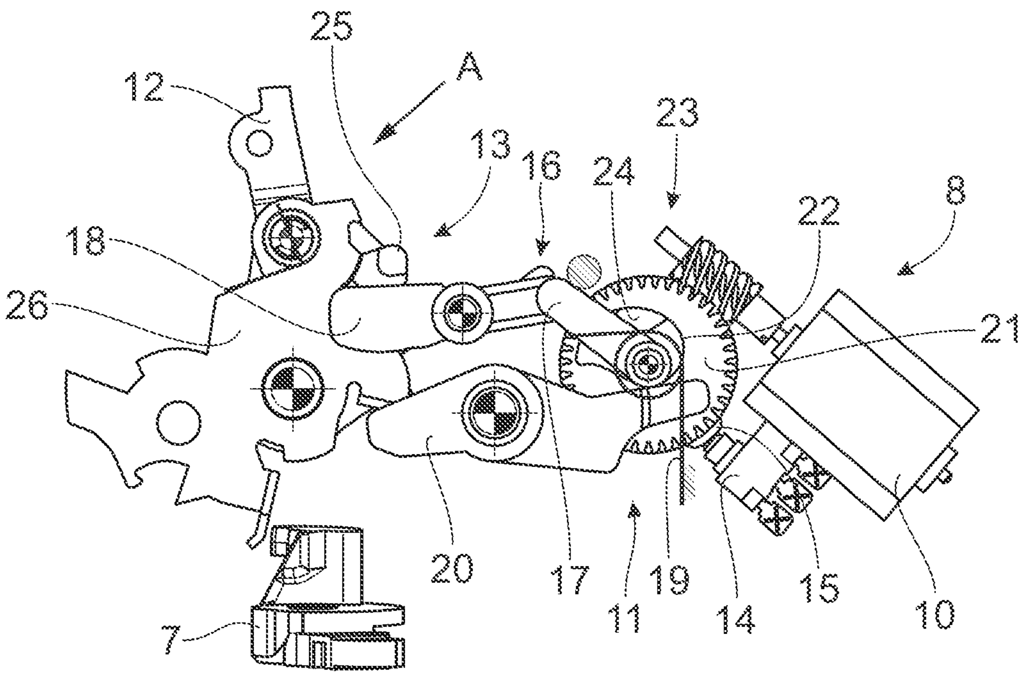
FIG. 4 shows the components from FIG. 3 in the intermediate position of the adjusting arrangement.
Figure 4:
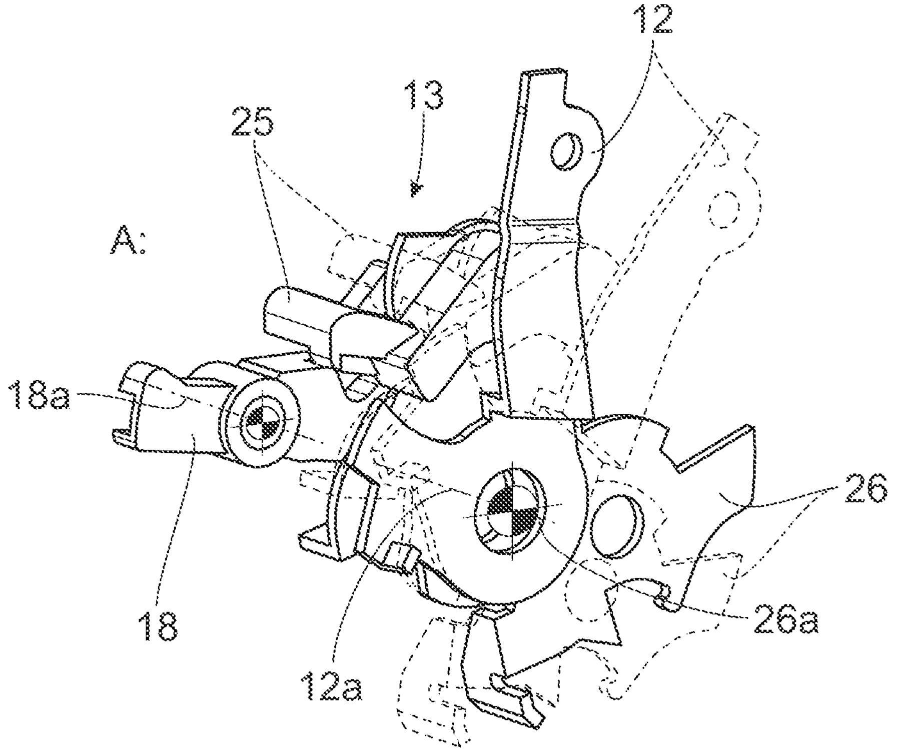

Consequently, although, with the unlocking routine, the opening movement explained above is started starting from the starting position illustrated in FIG. 3, the control is modified when the intermediate position criterion is fulfilled, which corresponds to the reaching of the intermediate position illustrated in FIG. 4 and the associated unlocking of the motor vehicle lock 1. In this case, it is the case that the raising position illustrated in FIG. 5 is not reached. The unlocking routine can then be employed deliberately when only unlocking of the motor vehicle lock 1 is necessary while avoiding opening, for instance in emergency operation.

It is particularly preferred here that the drive controller 9 modifies the control when the intermediate position criterion is fulfilled, such that the opening movement ends before the raising position is reached by the adjusting arrangement 11, for example in that the drive controller 9 switches the drive arrangement 8 into a currentless state when the intermediate position criterion is fulfilled. The drive arrangement 8 may be configured in a self-locking manner, such that the drive arrangement 8 remains in the intermediate position from FIG. 4 even when not subjected to a drive power, and the motor vehicle lock 1 thus remains unlocked. Alternatively, it is conceivable for the intermediate position to be maintained on the basis of control by the drive controller 9, for instance in the case of a non-self-locking configuration of the drive arrangement 8.

According to a one or more embodiments, the drive controller 9 controls the drive arrangement 8 in the unlocking routine with a drive power that is reduced compared with a predefined drive power provided normally during operation for the opening movement. The predefined drive power is, for example, chosen such that, with the opening movement, rapid raising of the pawl 7 takes place in order to ensure a rapid reaction of the motor vehicle lock 1 to an opening desire on the part of the user. In contrast, in the unlocking routine that takes place during emergency operation, safety with regard to undesired opening has priority, and so the driving speed is reduced in order to avoid the reaching of the raising position by the adjusting arrangement 11 with a high degree of reliability. The drive power can be reduced at least partially via the opening movement.

The drive controller 9 controls the drive arrangement 8 via a modulation of a drive power, such as via pulse-width modulation of the drive voltage. In the unlocking routine, the duty cycle of the modulation can be at least partially reduced compared with the drive power provided normally during operation.

According to an example configuration, the drive controller 9, in the unlocking routine, monitors an electric drive value, e.g., the drive current and/or the drive voltage, of the drive arrangement 8, wherein the intermediate position criterion relates to the drive value. The drive values may be used to check whether the drive arrangement 8, starting from the starting position, has already passed through a drive movement, which corresponds to adjustment of the adjusting arrangement 11 into the intermediate position. The intermediate position criterion may be defined at least partially in that the number of current ripples of the drive current that are passed through in the opening movement exceeds a predefined minimum number. The current ripples may be commutation ripples of the drive motor 10 configured as a rotary DC motor, which occur regularly with the driving movement. Through evaluation of the flow of the drive current, conclusions can be drawn about the adjustment path of the adjusting arrangement 11 that has already been covered with the opening movement.

According to a further configuration, the drive controller 9 alternatively or additionally monitors, in the unlocking routine, sensor values of a position sensor of the adjusting arrangement 11 and/or of the drive arrangement 8. The intermediate position criterion relates in this case to the sensor values provided by the position sensor, which allow conclusions to be drawn about the position of the adjusting arrangement 11.

According to one configuration, the position sensor has an electric switch 14 associated with the adjusting arrangement 11. The adjusting arrangement 11 actuates the switch 14 when the intermediate position is reached, as illustrated in FIG. 4. To this end, the adjusting arrangement 11 can have a switching contour 15 that actuates the switch 14 in the intermediate position. The intermediate position criterion is defined at least partially by actuation of the switch, with the result that a change made to the switching state of the switch 14 causes the discussed modification of the control in the opening movement.

Likewise, the position sensor can have an incremental position sensor, such as a Hall sensor associated with the drive arrangement 8, and the intermediate position criterion can be at least partially defined in that the sensor values of the incremental position sensor exceed a predefined minimum value. The Hall sensor can sense for example sensor elements arranged on the drive shaft of the drive motor 10. Starting from the starting position, it is possible for example for the passed-through Hall flanks in the sensor values to be counted and any exceeding of a predefined minimum number to be monitored. Likewise, it is possible, as an alternative or in addition to the switch 14 already discussed, for a Hall sensor to be associated with the adjusting arrangement 11 and thus to sense the reaching of the intermediate position.

In this case, the motor vehicle lock 1 has a locking arrangement 16, which has a locking lever 17 that is pivotable about a geometric locking-lever axis 17*a* between a locking position (FIG. 2, FIG. 3) and an unlocking position (FIG. 4, FIG. 5). The locking lever 17, in the unlocking position, shifts the clutch arrangement 13 into the engaging state, in this case via a holding lever 18, which is pivotable about a geometric holding-lever axis 18*a*, of the locking arrangement 16. Furthermore, the adjusting arrangement 11, when the intermediate position is reached, shifts the clutch arrangement 13 via adjustment of the locking lever 17 into the unlocking position, as is clear from FIG. 4.

In this case, the locking lever 17 is spring-preloaded in the direction of the unlocking position, wherein the adjusting arrangement 11, in the starting position according to FIG. 3, holds the locking lever 17 in the locking position. As a result, the clutch arrangement 13 adopts the disengaging state in the starting position of the adjusting arrangement 11. The spring preloading is in this case brought about via a spring element 19 associated with the locking lever 17.

According to the illustrated configuration, the adjusting arrangement 11 has an adjusting lever 20 that is pivotable about a geometric adjusting-lever axis 20*a*, and a worm wheel 21 that is rotatable about a geometric axis of rotation 21*a* and, in a rotary movement, pivots by way of a guide contour 22 upon reaching the raising position in order to raise the pawl 7. In this case, the drive arrangement 8 is coupled to the worm wheel 21 via a worm gear 23, wherein the rotary driving movement of the drive motor 10 is converted into rotation of the worm wheel 21. The opening movement corresponds in this case to a rotary movement of the worm wheel 21 in the clockwise direction in FIG. 3. The guide contour 22 may be an eccentric, circumferential guide surface, which, in the opening movement, comes into contact with the adjusting lever 20. The worm wheel 21 has a driver 24 for the locking lever 17, which shifts the locking lever 17 into the unlocking position upon reaching the intermediate position according to FIG. 4. In this case, the adjusting-lever axis 16*a* is identical to the axis of rotation 21*a*, wherein, the adjusting lever 20 is spring-preloaded against the driver 24.

In this case, the clutch arrangement 13 has a clutch lever 25 that is pivotable about a geometric clutch-lever axis 25*a*. In the disengaging state of the clutch arrangement 13, the clutch lever 25 is in a disengaging position in which the clutch lever 25, during an actuating stroke of the actuating lever 12, is out of coupling engagement with the actuating lever 12. In FIG. 3, the clutch lever 25 is in such a disengaging position. An adjusting movement can then not be transmitted from the actuating lever 12 to the pawl 7.

Moreover, in the engaging state of the clutch arrangement 13, the clutch lever 25 is in an engaging position in which the clutch lever 25, during an actuating stroke of the actuating lever 12, is in coupling engagement with the actuating lever 12 or comes into coupling engagement with the actuating lever 12. This is shown in particular in the rear view A in FIG. 4. In coupling engagement, an adjusting movement can then be transmitted from the actuating lever 12 to the pawl 7.

The adjusting arrangement 11 raises the pawl 7 with the opening movement by a release lever 26 that is pivotable about a geometric release-lever axis 26*a* and is arranged between the adjusting arrangement 11 and pawl 7. The clutch arrangement 13 may be arranged between the actuating lever 12 and the release lever 26 and connects the actuating lever 12 in the engaging state to the release lever 26.

The geometric clutch-lever axis 25*a* may extend parallel to the geometric actuating-lever axis 12*a* of the actuating lever 12. The clutch lever 25 may be arranged on the release lever 26 so as to be pivotable about the clutch-lever axis 25*a*. The geometric clutch-lever axis 25*a* may be arranged for conjoint rotation on the actuating lever 12, meaning that the geometric clutch-lever axis 25*a* moves together with the further actuating lever 12 when the latter is adjusted between its starting position and its actuating position. The clutch lever 25 may be spring-preloaded in the direction of its engaging position.

In one or more embodiments, the motor vehicle lock 1 has a further actuating lever 27 (schematically shown in FIG. 2) and is pivotable about a geometric actuating-lever axis, e.g., an internal actuating lever, wherein, as a result of the actuating stroke of the further actuating lever 27, the pawl 7 is able to be raised. The further actuating lever 27 can raise the pawl 7 by way of the actuating stroke, likewise by the above-described release lever 26.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE NUMBERS

1 motor vehicle lock
2 motor vehicle
3 side door
4 motor vehicle body
5 lock latch
6 locking part
7 pawl
8 drive arrangement
9 drive controller
10 drive motor
11 actuating arrangement
12 actuating lever
13 clutch arrangement
14 switch
15 switching contour
16 locking arrangement

17 locking lever
18 holding lever
19 spring element
20 lever
21 worm wheel
22 guide contour
23 worm gear
24 driver
25 clutch lever
26 release lever
27 actuating lever
**5*a*** geometric lock—latch axis
**7*a*** geometric pawl axis
**12*a*** geometric actuating—lever axis
**16*a*** adjusting—lever axis
**17*a*** geometric locking—lever axis
**18*a*** geometric holding—lever axis
**20*a*** geometric adjusting—lever axis
**21*a*** rotation
**25*a*** clutch—lever axis
**26*a*** geometric release—lever axis While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A motor vehicle lock comprising:

a lock latch pivotable about a geometric lock-latch axis and having at least one pawl that is pivotable about a geometric pawl axis, wherein the lock latch is adjustable into an open position and into at least one locked position, wherein the pawl is adjustable into a lowered position, in which it holds the lock latch in the at least one locked position, and into a raised position, in which it releases the lock latch; and an electric drive arrangement and a drive controller, wherein the drive controller controls the drive arrangement to carry out an opening movement in which the drive arrangement adjusts an adjusting arrangement of the motor vehicle lock starting from a starting position to a raising position of the adjusting arrangement, in which the adjusting arrangement raises the pawl, wherein the motor vehicle lock has an actuating lever that is pivotable about a geometric actuating-lever axis, wherein a clutch arrangement is arranged between the actuating lever and the pawl, the clutch arrangement being shiftable between an engaging state and a disengaging state, wherein, in the disengaging state, an actuating stroke of the actuating lever is an idle stroke with regard to raising of the pawl, and wherein, in the engaging state, the pawl is raisable via the actuating stroke of the actuating lever, wherein, in an intermediate position provided between the starting position and the raising position, the adjusting arrangement, in the opening movement, shifts the clutch arrangement out of the disengaging state and into the engaging state before the adjusting arrangement raises the pawl when the raising position is reached, wherein in an unlocking routine, the drive controller controls the drive arrangement to start the opening movement, and the drive controller, upon fulfilling an intermediate position criterion representative for reaching the intermediate position, modifies the control such that the adjusting arrangement does not reach the raising position;

wherein the drive controller, upon fulfilling the intermediate position criterion, modifies the control such that the opening movement ends before the adjusting arrangement reaches the raising position.

2. The motor vehicle lock of claim 1, wherein the drive controller, in the unlocking routine, controls the drive arrangement with a drive power that is reduced compared with a predefined drive power provided normally during operation for the opening movement.

3. The motor vehicle lock of claim 1, wherein the drive controller, in the unlocking routine, monitors an electric drive value of the drive arrangement, and wherein the intermediate position criterion relates to the drive value.

4. The motor vehicle lock of claim 1, wherein the drive controller, in the unlocking routine, monitors sensor values of a position sensor of the adjusting arrangement, and the intermediate position criterion relates to the sensor values.

5. The motor vehicle lock of claim 4, wherein the position sensor has an electric switch configured to be actuated by the adjusting arrangement upon reaching the intermediate position, and wherein the intermediate position criterion is defined at least partially by the actuation of the switch.

6. The motor vehicle lock of claim 5, wherein the position sensor includes an incremental position sensor associated with the drive arrangement, and wherein the intermediate position criterion is defined at least partially in that the sensor values of the incremental position sensor exceed a predefined minimum value.

7. The motor vehicle lock of claim 1 further comprising a locking arrangement having a locking lever that is pivotable about a geometric locking-lever axis between a locking position and an unlocking position, wherein the locking lever, in the unlocking position, shifts the clutch arrangement into the engaging state, and wherein the adjusting arrangement, upon reaching the intermediate position, shifts the clutch arrangement into the unlocking position via adjustment of the locking lever.

8. The motor vehicle lock of claim 7, wherein the locking lever is spring-preloaded in a direction of the unlocking position, and wherein the adjusting arrangement, in the starting position, holds the locking lever in the locking position.

9. The motor vehicle lock of claim 1, wherein the adjusting arrangement has an adjusting lever that is pivotable about a geometric adjusting-lever axis and a worm wheel that is rotatable about an axis of rotation and, the worm wheel, in a rotary movement, pivots the adjusting lever by way of a guide contour upon reaching the raising position in order to raise the pawl, and wherein the worm wheel has a driver for the locking lever that shifts the locking lever, upon reaching the intermediate position, into the unlocking position.

10. The motor vehicle lock of claim 1, wherein the clutch arrangement has a clutch lever that is pivotable about a geometric clutch-lever axis, wherein the clutch lever, in the disengaging state of the clutch arrangement, is in a disengaging position in which the clutch lever is out of coupling engagement with the actuating lever during an actuating stroke of the actuating lever, and wherein the clutch lever, in the engaging state of the clutch arrangement, is in an engaging position in which the clutch lever is in coupling engagement with the actuating lever or comes into coupling engagement with the actuating lever during an actuating stroke of the actuating lever.

11. The motor vehicle lock of claim 1, wherein the adjusting arrangement raises the pawl, upon reaching the raising position, by means of a release lever that is pivotable about a geometric release-lever axis and is arranged between the adjusting arrangement and pawl.

12. The motor vehicle lock of claim 11, wherein the clutch lever is arranged on the release lever so as to be pivotable about the clutch-lever axis.

13. The motor vehicle lock of claim 1, further comprising a second actuating lever that is pivotable about a geometric actuating-lever axis, wherein the pawl is raisable by an actuating stroke of the second actuating lever.

14. The motor vehicle lock of claim 13, wherein the second actuating lever raises the pawl by an actuating stroke of a release lever.

15. The motor vehicle lock of claim 1, wherein the at least one locked position includes a main locked position and a pre-locked position between the open position and the main locked position.

16. The motor vehicle lock of claim 1, wherein the actuating lever is an external actuating lever.

17. The motor vehicle lock of claim 1, wherein the drive controller, in the unlocking routine, monitors an electric drive value of a drive current and/or a drive voltage of the drive arrangement, and wherein the intermediate position criterion relates to the drive value, and wherein the intermediate position criterion is defined at least partially in that a number of current ripples of the drive current that are passed through in the opening movement exceeds a predefined minimum number.

18. A motor vehicle lock comprising:

a lock latch pivotable about a geometric lock-latch axis and movable between an open position and a locked position;

a pawl pivotable about a geometric pawl axis and movable between a lowered position in which the lock latch is held locked and a raised position in which the lock latch is released;

an adjusting arrangement configured to move the pawl between the lowered and raised position;

an electric drive arrangement configured to adjust the adjustment arrangement;

an actuating lever pivotable about a geometric actuating-lever axis;

a clutch arrangement disposed between the actuating lever and the pawl, the clutch arrangement being shiftable between an engaging state and a disengaging state, wherein, in the disengaging state, an actuating stroke of the actuating lever is an idle stroke with regard to raising of the pawl, and wherein, in the engaging state, the pawl is raisable via the actuating stroke of the actuating lever, wherein, the adjustment arrangement includes a starting position, a raising position, and an intermediate position provided between the starting position and the raising position, wherein the adjusting arrangement, in an opening movement, shifts the clutch arrangement out of the disengaging state and into the engaging state before the adjusting arrangement raises the pawl when the raising position is reached;

a locking arrangement having a locking lever that is pivotable about a geometric locking-lever axis between a locking position and an unlocking position, wherein the locking lever, in the unlocking position, shifts the clutch arrangement into the engaging state, and wherein the adjusting arrangement, upon reaching the intermediate position, shifts the clutch arrangement into the unlocking position via adjustment of the locking lever; and a drive controller configured to:

actuate the drive arrangement to adjust the adjusting arrangement from the starting position to the raising position to raise the pawl, and in an unlocking routine, control the drive arrangement to start the opening movement, and, upon fulfilling an intermediate position criterion representative of reaching the intermediate position, modify the control such that the adjusting arrangement does not reach the raising position.

19. A motor vehicle lock comprising:

a lock latch pivotable about a geometric lock-latch axis and having at least one pawl that is pivotable about a geometric pawl axis, wherein the lock latch is adjustable into an open position and into at least one locked position, wherein the pawl is adjustable into a lowered position, in which it holds the lock latch in the at least one locked position, and into a raised position, in which it releases the lock latch; and an electric drive arrangement and a drive controller, wherein the drive controller controls the drive arrangement to carry out an opening movement in which the drive arrangement adjusts an adjusting arrangement of the motor vehicle lock starting from a starting position to a raising position of the adjusting arrangement, in which the adjusting arrangement raises the pawl, wherein the motor vehicle lock has an actuating lever that is pivotable about a geometric actuating-lever axis, wherein a clutch arrangement is arranged between the actuating lever and the pawl, the clutch arrangement being shiftable between an engaging state and a disengaging state, wherein, in the disengaging state, an actuating stroke of the actuating lever is an idle stroke with regard to raising of the pawl, and wherein, in the engaging state, the pawl is raisable via the actuating stroke of the actuating lever, wherein, in an intermediate position provided between the starting position and the raising position, the adjusting arrangement, in the opening movement, shifts the clutch arrangement out of the disengaging state and into the engaging state before the adjusting arrangement raises the pawl when the raising position is reached, wherein in an unlocking routine, the drive controller controls the drive arrangement to start the opening movement, and the drive controller, upon fulfilling an intermediate position criterion representative for reaching the intermediate position, modifies the control such that the adjusting arrangement does not reach the raising position;

wherein the drive controller, in the unlocking routine, controls the drive arrangement with a drive power that is reduced compared with a predefined drive power provided normally during operation for the opening movement.

* * * * *